June 19, 1945.   F. KOPPELMANN ET AL   2,378,561
COMMUTATOR DEVICE
Filed July 10, 1941
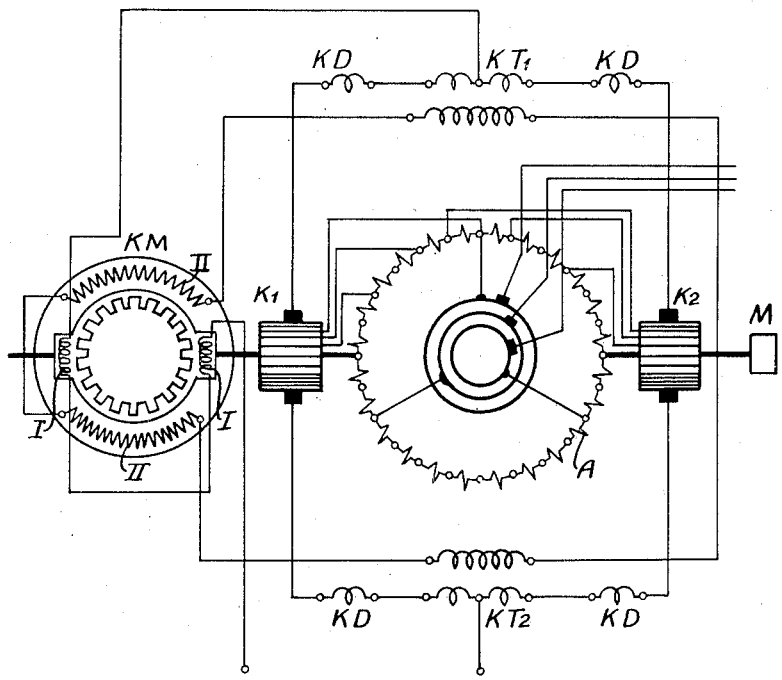
Inventors:
FLORIS KOPPELMANN
WILHELM LEUKERT
By Alldcombe
Attorney.

Patented June 19, 1945

2,378,561

UNITED STATES PATENT OFFICE 2,378,561

COMMUTATOR DEVICE

Floris Koppelmann and Wilhelm Leukert, Berlin-Siemensstadt, Germany; vested in the Alien Property Custodian Application July 10, 1941, Serial No. 401,787
In Germany March 15, 1940

4 Claims. (Cl. 172—281)

This invention relates to improvements in electric commutator devices. It has been well known in the art of electric machines and similar devices to collect the electric current induced within a winding in an armature revolving relatively with respect to a magnetic field with the aid of commutators, which comprise a series of metal segments connected to taps of said winding, said segments being insulated with respect to each other, cooperating with stationary brushes, against which said commutators rotate. Such devices have been employed for collecting electric currents generated to supply electrical energy to electric machines and also in current converters. In these commutator machines, the commutation which involves in most cases a short-circuiting of at least part of the armature winding, presents difficulties, for the removal of which a variety of methods has been proposed. These methods however have not been entirely satisfactory.

According to the present invention the machines and devices of this type are considerably improved by inserting reactors in the commutating circuit preferably in the exterior connecting conductors between such commutators cooperating with one another, the reactors being so dimensioned that they become saturated by relatively low currents, for example small fractions, such as $\frac{1}{10}$ to $^{10}/_{10,000}$, of the normal currents.

To generate a commutation voltage, a special commutator machine or auxiliary commutating generator is provided, said commutating voltage facilitating the changing-over from one group of segments to the other with the frequency of the switching operation. The reactors saturated by relatively low currents lie in series with an auxiliary generator and may be connected, if need, in shunt with variable capacitative or ohmic resistances. This commutator machine is preferably designed in the form of an induction generator having an energizing winding traversed by the current taken from the segments, said winding being, for example, a concentrated winding located in the stator. For example, with a frequency changer constructed according to the invention the conversion of a single-phase current or three-phase current of a given frequency into a current of a frequency, controllable at will, is made possible, whereby a simple control and a great output can be obtained. It is also possible to attain a considerable improvement in the commutation of three-phase commutator machines and single-phase traction motors by employing said commutating devices, since in the three-phase commutator machines the conventional interpoles cannot be employed, so that the output of these machines is very limited. It is true that the stator-energized three-phase commutator machines make the use of interpoles possible, but they cannot be employed for considerable regulating ranges and high frequencies.

Since it is practically impossible to introduce a commutating voltage of such a magnitude that the current in the brush becomes exactly zero, when the segment separates from said brush, a somewhat higher commutation voltage is preferably impressed and the excess current is absorbed in a commutation reactor, when the current passes through the zero value. Thus, it is possible to extend the zone within which the current obtains the zero value and to prevent a flow of the current, when the segment separates from the brush. Said commutation reactors are also necessary for other reasons, since electromotive forces of transformation are produced in the armature winding coils short-circuited during the commutation by the rotating field and are absorbed by the reactors, in order to reduce the short-circuit currents caused by these voltages of transformation to a minimum.

The size of the reactor depends upon the magnitude of the voltage which the reactor must absorb, when the current passes through the zero value. For this reason, the commutating voltage should not be chosen too high, since the reactors must also absorb the voltage of transformation and in the case of a small number of segments also the commutating voltage. The natural commutating voltage cannot be utilized to cause the current to pass through the zero value, since it may occur that in the case of a given slip it does not lie properly in the ascending portion of the sinusoidal half waves produced, whereas it does in the descending portion. The following segment must however possess always the higher voltage when passing from one segment to the next one.

In the attached drawing a diagrammatic illustration of the invention applied to a frequency transformer, such as employed in frequency changers of three-phase commutator machines and in converters, is shown. The frequency transformer has an armature winding A whose odd-numbered taps are connected to the commutator $K_1$ at the left and whose even-numbered taps are connected to the commutator $K_2$ at the right. Each commutator has as many segments as there are taps of the armature winding, so that every second segment is connected to said winding. The width of the brush contacting the commutator segment should not be larger than that of an unconnected segment lying between commutator segments connected to the winding. In order to avoid brushes too narrow in width, the number of segments should be chosen larger than that of the winding connections, and the width of the current carrying segments and of the unconnected segments lying between the former may be changed by connecting several segments with each other. The supply of three-phase current of constant frequency is effected through three slip rings connected to three taps of the armature winding, displaced 120 electrical degrees, i. e., in a similar manner as in the known frequency transformers for rotary converters. The stator of the frequency transformer has no winding. It forms merely a magnetic return for the rotor field. The armature is driven by small controllable motor M whose output is depending upon the friction of the frequency transformer caused by air, bearings, and the commutator.

The machine may be driven subsynchronously, or preferably hypersynchronously, in order to avoid that the maximum frequency, for example, of 50 cycles in case of stationary armature is to be supplied. In case of a hypersynchronous drive, direct current is supplied in synchonism and the frequency in double synchronism. All frequencies between zero and the maximum frequency, for example, of 50 cycles, can be obtained. The control of the voltage supplied through the commutator is effected by shifting the brushes. Commutation transformers $KT_1$ and $KT_2$ are inserted between the brushes $K_1$ and $K_2$, the primary winding being energized by the commutator machine KM. The latter has a running winding II arranged in the grooves of the stator laminations as used in high frequency machines designed in the form of homopolar generators. The rotor Z has the shape of a gear whose number of teeth is determined by the commutating frequency and the number of segments, respectively. It is driven at the same speed as the armature of the frequency transformer. The exciting winding I of the commutator machine which is, for example, constructed as a concentrated winding and arranged in the stator laminations is energized by the produced current of variable frequency. The commutator machine is dimensioned substantially with regard to the segment output, i. e., with regard to the product: commutating voltage multiplied by the maximum current flowing through the brushes.

Commutation reactors KD, which have the function to absorb the voltage of transformation and the excess commutating voltage when the current passes the zero value, are inserted in the path of the short-circuit current between the brushes $K_1$ and $K_2$.

The reactors must be dimensioned so that they are unsaturated, when small currents, for example, currents smaller than one ampere, flow, and they are capable of absorbing all voltages occurring in the path of the short circuit current. If currents greater than one ampere flow, the reactors must be separated as far as possible.

The above described commutating device may be employed in three-phase commutator machines, single-phase traction motors as well as in direct current commutator machines. Furthermore, it may be employed to advantage in frequency transformers which operate on the converter system and enable a continuous regulation of the frequency free from loss. With such device a six-phase or twelve-phase transformer would operate through two commutators or through two controlled switch devices, the drive being effected in accordance with the desired frequency. The above described device may also be employed in the usual frequency changers with tubes.

As a further improvement, the commutating voltage may be chosen proportionally with respect to the main field and may be supplied in such a manner that it counteracts the voltage of transformation. The arrangement is very simple, if the primary winding of the transformer is connected in parallel with respect to the energizing winding. Also the interpoles may be omitted and a commutating voltage produced outside of the machine, preferably by means of a particular commutator machine, which may be connected in series with a counter-voltage. The omission of the interpoles enables a very good utilization of the space so that machines of equal output are of smaller dimensions than those heretofore known.

The invention is not limited to the above described embodiment. For example, the switching-over between the various tappings of a step transformer may be effected according to the invention. Furthermore, the invention may be applied to advantage in any combination as well as in connection with the systems described in U. S. Patents Nos. 2,181,152; and 2,351,975. Resistances may be inserted between the main and auxiliary segments, respectively, which may be ohmic, inductive, capacitive, or of combined type.

What is claimed is:

1. In an electrical machine, a rotatable armature, two commutators each having segments connected to the windings of said armature, two pairs of brushes, each pair having a brush associated with one commutator and a corresponding brush associated with the other comutator, an external circuit having two branches connected, respectively, to the two brushes of one pair and having two branches at the other end connected, respectively, to the two brushes of the other pair, means in each branch for increasing the effective resistance thereof as the current approaches zero during commutation, an auxiliary commutating generator including an element rotating in synchronism with the armature of said machine and means for causing said generator to deliver commutating voltages to the local circuits connecting the brushes of each of said pairs of brushes.

2. An electrical machine according to claim 1 wherein said element is an inductor and said auxiliary generator has an exciting winding in series with said external circuit and a circuit including an armature winding of said generator is provided together with two transformers for coupling said armature circuit to the local circuits which connect the two brushes of each pair of brushes.

3. In an electrical machine, a rotatable armature, two commutators each having segments connected to the windings of said armature, two pairs of brushes, each pair having a brush associated with one commutator and a corresponding brush associated with the other commutator, an external circuit having two branches connected, respectively, to the two brushes of one pair and having two branches at the other end connected, respectively, to the two brushes of the other pair, means in each branch for increasing the effective resistance thereof as the current approaches zero during commutation, and an auxiliary generator for producing voltages between each pair of brushes which oppose the reactance voltages of armature coils undergoing commutation.

4. In an electrical machine, a rotatable armature, two commutators each having segments connected to the windings of said armature, two pairs of brushes, each pair having a brush associated with one commutator and a corresponding brush associated with the other commutator, an external circuit having two branches connected, respectively, to the two brushes of one pair and having two branches at the other end connected, respectively, to the two brushes of the other pair, means for generating commutating voltages and an inductive reactor in each branch for increasing the effective resistance thereof as the current approaches zero during commutation, said reactors being so designed that they become saturated on the current produced by the commutating voltages plus the reactance voltage of the armature coils short circuited during commutation.

FLORIS KOPPELMANN.
WILHELM LEUKERT.